US007543243B2

(12) United States Patent
Schwartz et al.

(10) Patent No.: US 7,543,243 B2
(45) Date of Patent: *Jun. 2, 2009

(54) IDENTIFYING LIKELY RECIPIENTS OF A MESSAGE

(75) Inventors: Jordan Luther King Schwartz, Seattle, WA (US); Marc Adam Silbey, Seattle, WA (US); Ahsan Syed Kabir, Seattle, WA (US); Cees Van Dok, Bellevue, WA (US); Hilary Palmen, Redmond, WA (US); Gail Borod Giacobbe, Seattle, WA (US); Sandra Barnet, Seattle, WA (US); Vivien Park, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 584 days.

This patent is subject to a terminal disclaimer.

(21) Appl. No.: 10/342,652

(22) Filed: Jan. 15, 2003

(65) Prior Publication Data

US 2004/0135816 A1 Jul. 15, 2004

(51) Int. Cl.
*G06F 3/00* (2006.01)

(52) U.S. Cl. .................. 715/811; 715/752; 715/711; 715/862

(58) Field of Classification Search ............. 715/811, 715/745, 752
See application file for complete search history.

(56) References Cited

U.S. PATENT DOCUMENTS

| 6,005,567 | A  | * | 12/1999 | Nielsen ................. 715/823 |
| 6,247,043 | B1 | * | 6/2001  | Bates et al. ............. 709/200 |
| 6,295,355 | B1 | * | 9/2001  | O'Neal et al. .......... 379/355.05 |
| 6,708,205 | B2 | * | 3/2004  | Sheldon et al. ........... 709/206 |
| 6,952,805 | B1 | * | 10/2005 | Tafoya et al. ............ 715/739 |
| 7,016,937 | B1 | * | 3/2006  | Malik .................... 709/206 |
| 7,159,207 | B2 | * | 1/2007  | Tang et al. .............. 717/109 |
| 2001/0019338 | A1 | * | 9/2001 | Roth ..................... 345/811 |
| 2004/0059784 | A1 | * | 3/2004 | Caughey ................. 709/206 |

OTHER PUBLICATIONS

"GroupWise User's Guide for Windows 32 bit" http://fresnounified.org/technology/groupwise/pdf/GW55Userguide.pdf Orem, Utah: Novell Inc., 1998. pp. 22-23, 108, 112-114, 122-125, 127-128 and 131.*

* cited by examiner

*Primary Examiner*—Stephen S Hong
*Assistant Examiner*—Ryan F Pitaro
(74) *Attorney, Agent, or Firm*—Shook, Hardy & Bacon, L.L.P.

(57) ABSTRACT

The present invention is directed to a system and method for identifying the most likely recipients for a message or other communication from a source and building a most frequently used list of recipients. The present invention utilizes a contact list and determines the likelihood that a list of recipients from that contact list are the intended targets for a current message. The likelihood determination is made using both how recent and how frequent prior communications were made to particular individuals or groups of recipients. Further, a user is able to switch between a most frequently used list of recipients and full list of contacts.

29 Claims, 3 Drawing Sheets

IDENTIFYING LIKELY RECIPIENTS OF A MESSAGE

CROSS-REFERENCE TO RELATED APPLICATIONS

None.

TECHNICAL FIELD

The present invention relates to computer software. More particularly, the invention relates to a system and method for identifying and enabling the selection of message recipients in the context of message addressing.

BACKGROUND OF THE INVENTION

Communications today involve a plethora of hardware and software components from a wide variety of manufacturers. In addition, messages originate from and are intended for a multitude of individuals, groups or organizations. The need for efficient and consistent identification of recipients for a message is essential to the success and usefulness of these communication components. In particular, a convenient and easy to use system and method is needed to correctly identify one or more recipients. Such a system and method should not rely on human memory of such abstract things as e-mail addresses or exact names. The average individual is already tasked today with associating and remembering too many pieces of information relating to both themselves and others. For example, there is the host of phone numbers—work, home, cell and pager, e-mail address, residence and business address, pin numbers, social security number, passwords for various computing systems or websites and so on. The ability to correctly recall each of these pieces of information about one's self can become quite unwieldy. When further tasked with remembering e-mail addresses or specific names for contacts to whom messages are sent, the burden is even further increased.

In the context of messaging with a computing device, such as sending e-mail on a computer system, it is often difficult in light of some of the reasons discussed above for a user to remember the exact name or e-mail address of one or more contacts for whom a message is intended. To overcome this problem, messaging systems that are currently in use enable a user to view and ultimately select one or more message recipients from a previously specified address book or from a list of all the users and groups within a particular organization. Regardless of the source of the list, the user is then required to scroll through the list and hopefully encounters a name or some other identifier that aides in jogging the user's memory so as to identify an intended recipient.

To overcome this long list and the associated search problem, some messaging systems present the user with a 'pick list'. Such a 'pick list' is a list that is limited to the last X number of mail recipients, sorted according to some predetermined order or user specified order. Such sort orders vary but include alphabetic ordering.

In each of these previous attempts to resolve the problem of recipient identification the systems all fail to address or account for the fact that in some cases an entry in a user's address book may be stale. A stale address or reference refers to a recipient whom the user no longer e-mails or e-mails on a very infrequent basis. Furthermore, in the case of systems that track and count recent messages, there is the possibility of a false weighting. For instance during a particular period in time, such as the closing of a business deal, a user may have had reason to communicate frequently with a particular recipient. However, once the transaction is completed, the user may never have reason to contact that recipient again. However, 'recent message systems' that are currently available will still assign a heavy weighting to that recipient. In such cases, as far as the system is concerned, that recipient has received recent e-mails albeit a temporary situation, as such that recipient will be included within the 'pick list' and assigned a high priority.

The issues raised with regards to existing messaging systems essentially relate to the fact that such systems provide a listing of most recent or most selected contacts rather than most likely contacts. Furthermore, the operation of current systems require the systems to keep endless array lists or lookup tables of all e-mailed addresses that are ever selected on a system, along with the associated count for each sent message to each recipient. Such requirements necessitate large storage capabilities by a system.

The need to disseminate and access information, and more critically the role that information plays in today's society, necessitate that information be centralized for ease of access and require that the integrity and security of such information be ensured.

In light of the foregoing, there exists a need to provide a system and method that will enable the identification of message recipients. More importantly, such identification would be based on the most likely recipients as determined by examining the frequency of selection of a particular recipient, recency of such selection and other such criteria that will provide a stable, consistent and easy to use address pick-list. Furthermore, there exists a need for a method of easily making such a 'pick-list' accessible to a user. Even further, there exists a need for a system and method that accomplishes the aforementioned objects without requiring or utilizing large volumes of storage.

SUMMARY OF THE INVENTION

The present invention is directed to a method and system for use in a computing environment to present a list of most likely recipients to a user during a messaging process, at a point when the user would specify the recipients of a message.

In one aspect of the present invention, a system and method are provided for presenting a shortened list of likely recipients from a full list of previously specified contacts such as from an electronic address book.

In another aspect of the present invention, a system and method are provided for listing recipients, in the order of the likelihood that such recipients are the intended target of a message, based on the frequency and recency of the receipt of similar messages by such recipients from a user.

In a further aspect of the present invention, a system and method are provided for enabling a user to switch between a full list of contacts and the list of most likely recipients.

In an even further aspect of the present invention, a system and method are provided for providing a most frequently used (MFU) recipient list that references an address book or contact list, such that a change in a recipient's contact information, like an e-mail address, would not impact the inclusion or position of that recipient in the MFU recipient list.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means, instrumentalities and combinations particularly pointed out in the appended claims.

BRIEF DESCRIPTION OF THE SEVERAL VIEWS OF THE DRAWING

The present invention is described in detail below with reference to the attached drawings figures, wherein.

DETAILED DESCRIPTION OF THE INVENTION

The present invention is directed to a system and method for identifying the most likely recipients of a message or other communication from a source. The present invention utilizes a contact list and determines the likelihood that one or more recipients is the intended target for a current message. The likelihood determination is made using information on both frequency and timing of prior communications that were made to particular individuals or group recipients.

According to the method of the present invention, a user is able to switch between a most frequently used list of recipients and full list of contacts. Furthermore, the present invention enables a user to improve the accuracy of the message identifying system by also tracking non-address book message targets. As part of tracking such message target recipients, the present invention prompts the user to add such targets to the address book after a certain number of messages have been addressed to that same target recipient.

Having briefly described an embodiment of the present invention, an exemplary operating environment for the present invention is described below.

Exemplary Operating Environment

Figure 1:
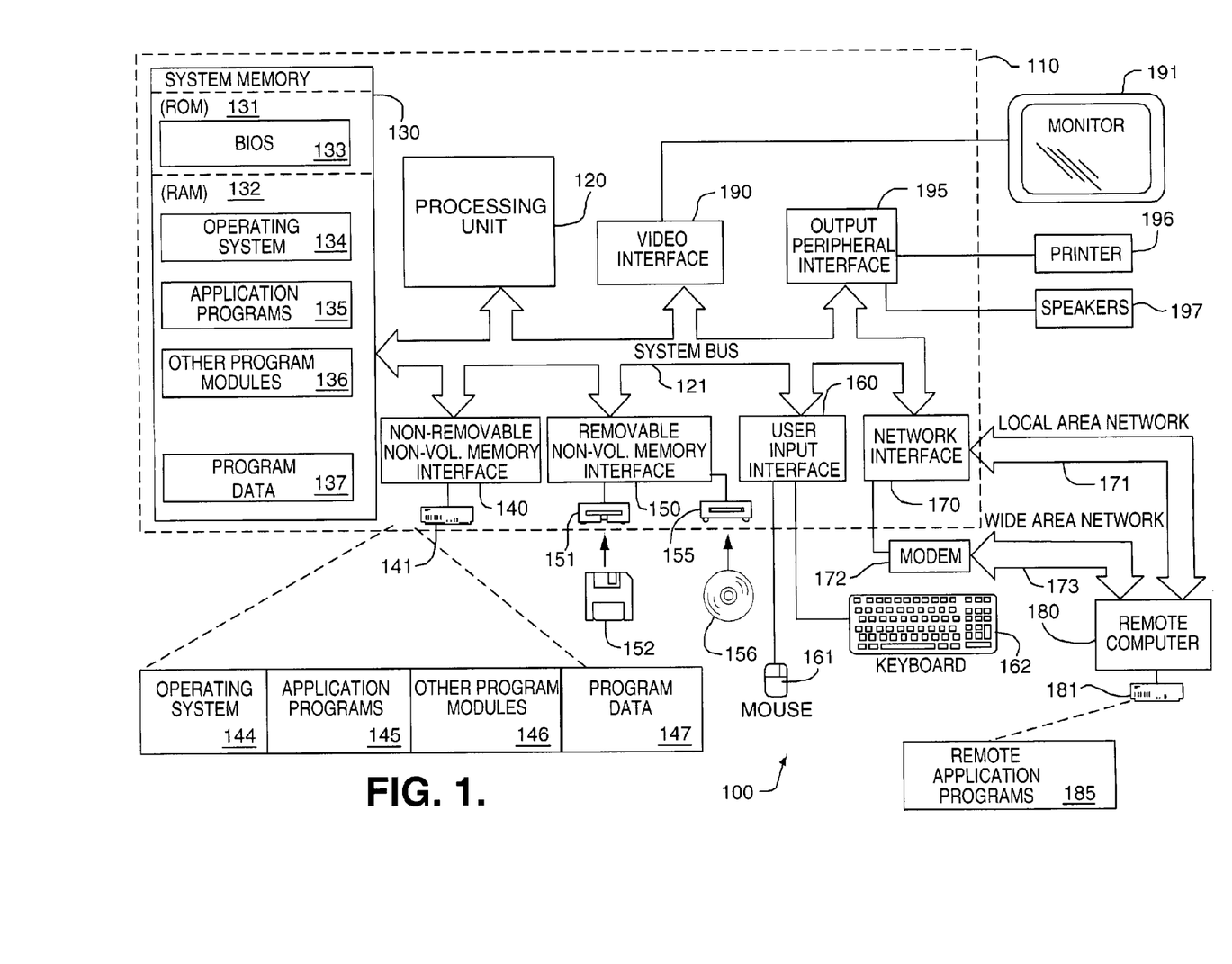
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. Examples of computer storage media include, but are not limited to, RAM, ROM, electronically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system, or necessary portion thereof, from the hard disk drive 140 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

System and Method for Identifying Message Recipients

The present invention is directed to a system and method for dynamically identifying recipients within a messaging system, by automatically presenting a list of the most likely intended recipients of a message. The list is presented at the point when a recipient designation would normally be provided within the messaging system. For example when sending an e-mail message, the list would be presented when the 'TO' textbook has the focus.

Figure 2A:
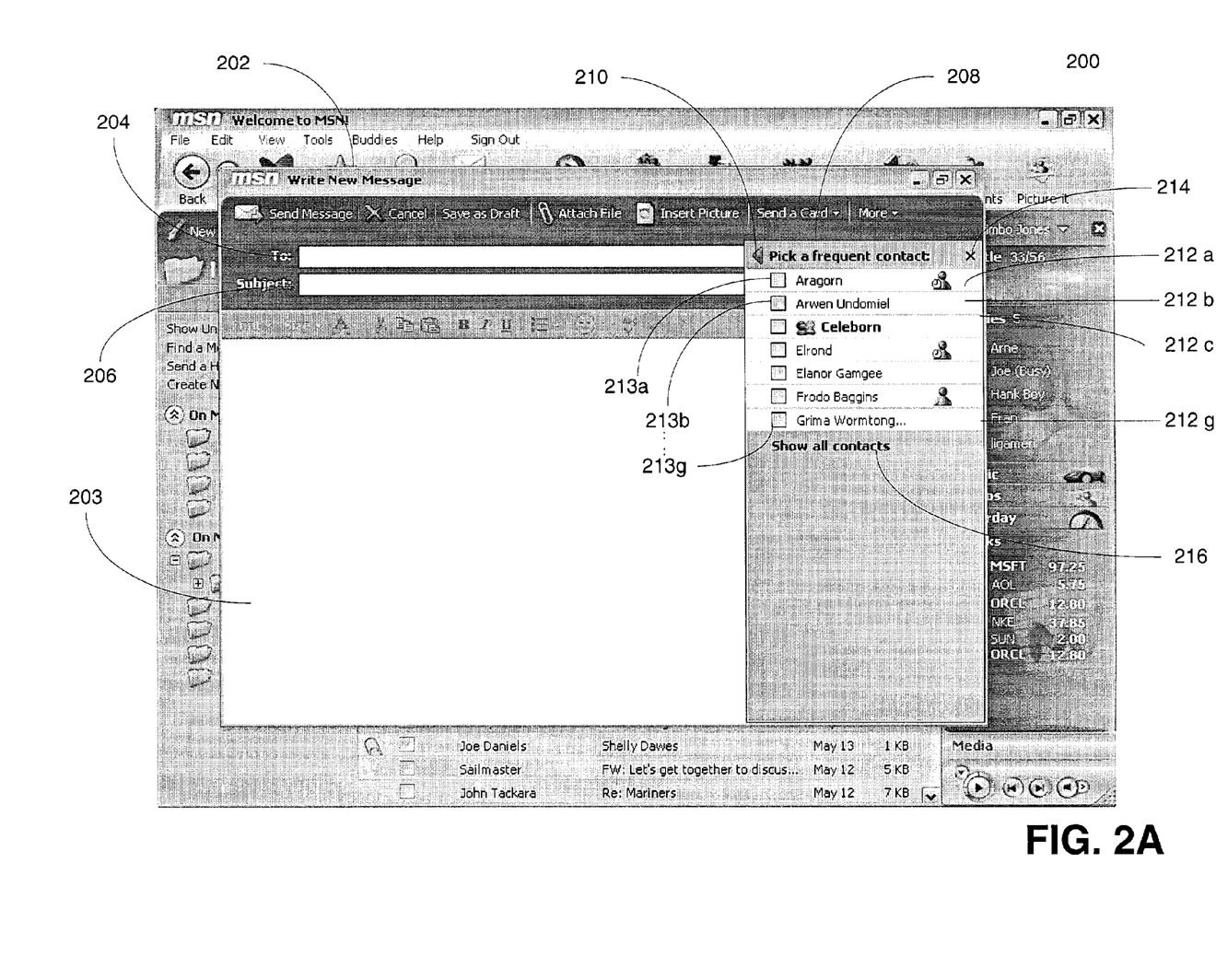
FIG. 2A is an illustrative screen shot of a messaging screen in which the address book pick-list of the present invention is shown in the most frequently used (MFU) mode.

The present invention will be discussed with reference to an implementation for a user and a computer based electronic mail system such as MICROSOFT's OUTLOOK product. With reference to FIG. 2A, a screen shot 200 of a PC environment that is executing MICROSOFT's WINDOWS Operating System is shown. A user who is utilizing the system is typically presented with a new message window 202, when the user indicates that the user desires to send a message. In the message window 202 the user can provide the details of a message in the text area 203, the name of one or more recipients in the 'To-textbox' 204 and a subject matter in the 'subject-textbox' 206. As shown, the new message window 202 also provides the user with the ability to perform several other actions and functions related to messaging such as sending messages, attaching a file and so on. Since these actions and functions do not impact the present invention they will not be discussed any further.

In operation, when the focus is on the 'To-textbox' 204 of the window 202, an address book pick-window 208 is automatically presented to the user. As would be understood by those skilled in the art, the automated display, the appearance of content, the positioning of the pick window 208 and other such features can be varied by design or end user specification, without departing from the scope of the present invention.

In an embodiment of the present invention, the pick-window 208 is displayed with a 'recipient well indicator' icon 210, a most frequently used (MFU) list of contacts 212, a 'close' icon 214 and a show-all-contacts icon 216. Each entry 212a-212g in the MFU list 212 represents a different contact or contact group. For example, contact 212a represents one contact, while contact 212c represents a defined contact group. Each of the selectable recipients (212a-212g) has an associated check box 213a-213g. If a user selects one or more of the check boxes 213a-213g, then the selected contacts are transferred to the "to-textbox" 204. The show-all-contacts icon 216 enables a user to alter the display within the pick window 208. In particular, the show-all-contacts icon 216 causes the display of a full list of the contacts that are available to the user from an address book or contact list. The details of the full list display will be discussed with reference to FIG. 2B. The contact list 212 may also contain other information about the contact, such as whether the contact is on a list that can be instant-messaged.

In an embodiment of the present invention, pick window 208 is automatically displayed when the 'To-textbox' 204 of the messaging window 202 has the focus. The same automated display would occur for any textbox field in which the user would usually specify a recipient such as a 'bcc' or 'cc' field. As the user shifts focus to another field such as the subject textbox field 206, the pick-list-window 208 is removed from the screen display.

Further, The identification of a most likely recipient of a message is based on previous messaging frequency and the recency of such messaging between the user and recipient. Accordingly, recipient Aragorn 212a was most frequently and more recently the recipient of messages from the user. This is the case rather than because of any other criteria such as spelling or other simplified ordering schemes. However, any such ordering would be considered within the scope of the present invention to the extent that such ordering is of a list of most likely recipients.

Although the pick-list-window 208 is illustrated with the selectable recipients 212a-212g ordered alphabetically, it should be understood that the ordering of such list could also be by recipient messaging frequency or other criteria. In other words, the first listed recipient such as Aragorn 212a would be in the first position by virtue of the fact that the recipient Aragorn 212a is the most likely recipient of a message rather than by virtue of being the first name alphabetically.

There are a variety of algorithms that can be implemented to determine the most frequently messaged or likely recipient. In an embodiment of the present invention, an algorithm maintains a count of the number of times that any and all recipients from an address book are selected as the targets for a message. Each time a user sends a particular recipient a message, the count is increased by one. This count can then be utilized to weight a particular recipient as to the frequency or likeliness of being the intended recipient. However, this weighting criteria is further refined by the present invention as will be described below.

A more sophisticated algorithm is implemented in an embodiment of the present invention, wherein an assigned weighting is utilized to determine the likeness of an intended recipient. The assigned weighting for a particular recipient is obtained through a process that limits recipient lists and more accurately determines the number of messages that are sent to a recipient. The weighting process is utilized to obtain a more realistic representation of the most likely recipients of a message. In order to accomplish this more realistic representation of the frequency of communications, a list with a fixed number of recipients is maintained. The list operates on a First In First Out (FIFO) basis. Once the list is full, the oldest recipient on the list is removed when a new recipient is designated by the user. By limiting the list to a fixed number, the efficiency of the system improves and resource utilization such as memory or storage is diminished. As an example, and without limitations, a fixed list array that can hold 250 address book reference contacts is maintained. When the user sends a mail message to a new person who is not already in the fixed list, the oldest reference entry (i.e. entry 1 of the 250) in the list is removed to make room for the newly designated mail recipient. This only occurs there are already 250 references in the list. For recipients already on the list, a count is incremented each time an e-mail message is sent to the recipient. For example, if there was already an entry referencing Johndoe@abc.com on the fixed list array, there is an associated count representing how often John Doe was the target recipient. The next time a message is addressed to John Doe, that count is incremented. In order to minimize the potential for de-stabilizing the list, neither the count associated with recipients is adjusted nor is an entry made into the list, any time a message is sent to six or more people. This prevents, among other things, the disruption or alteration of the list in instances where a user sends out a broadcast e-mail message, or multiple messages to large groups.

Recipients entered in the 'To-textbox' 204 that are not in an existing address book or contact list are tracked on a separate list. This separate list is updated when the user specifies a new recipient, rather than selecting one that exists within the MFU or full list. This list of non-address book recipients is monitored and updated to further aide the user in identifying most likely contacts. Recall that the most likely contacts are presented as selectable recipients 212a-212g in the MFU list 212. MFU list 212 has its origins in the fixed contact FILO list (i.e. list of 250 contacts) and thus the user's address book or contact list. In other words, to be incorporated in the MFU list 212, a potential recipient must first exist in the address book or contact list. Non-address book recipients must thus be added into the address book to facilitate identification as likely recipients. As such, a user is prompted by the present invention to add a non-address book recipient to the address book. The prompt occurs when a user enters a given non-address book recipient for the nth time. In one embodiment of the present invention, a configurable 'n' number of seven is utilized for prompting the user. As a result, the seventh time that a message is addressed to a non-address book recipient, the user will be prompted to add that recipient to the address book.

The MFU list 212 preferably is displayed with 'y' recipients listed in the most likely order, rather then alphabetically or otherwise. It will be appreciated that the list could be in any other order and that the number of displayed 'y' recipients can vary. For example, as shown in FIG. 2A a 'y' value of 7 is utilized in the displayed pick list window 208.

A group of multiple individual recipients are preferably treated in much the same manner as individual recipients. In other words, if a group of recipients, e.g. Celebron 212c, have been e-mailed by the user on a frequent basis, that group will be incorporated in the FILO list and ultimately included in the MFU list 212 as shown in FIG. 2A when the group becomes a likely recipient. Furthermore, the group recipient, like any individual recipient, can be the subject of a prompt for addition to the address book. The group can also be counted for e-mail frequency and be ordered within the MFU list 212.

As previously discussed, a user can optionally select to view a full list of recipients rather than the processed MFU list 212. The user makes this election by selecting the show-all-contacts icon 216. In response, the screen shot of FIG. 2B will be displayed, wherein a list of all contacts in the address book are presented.

Figure 2B:
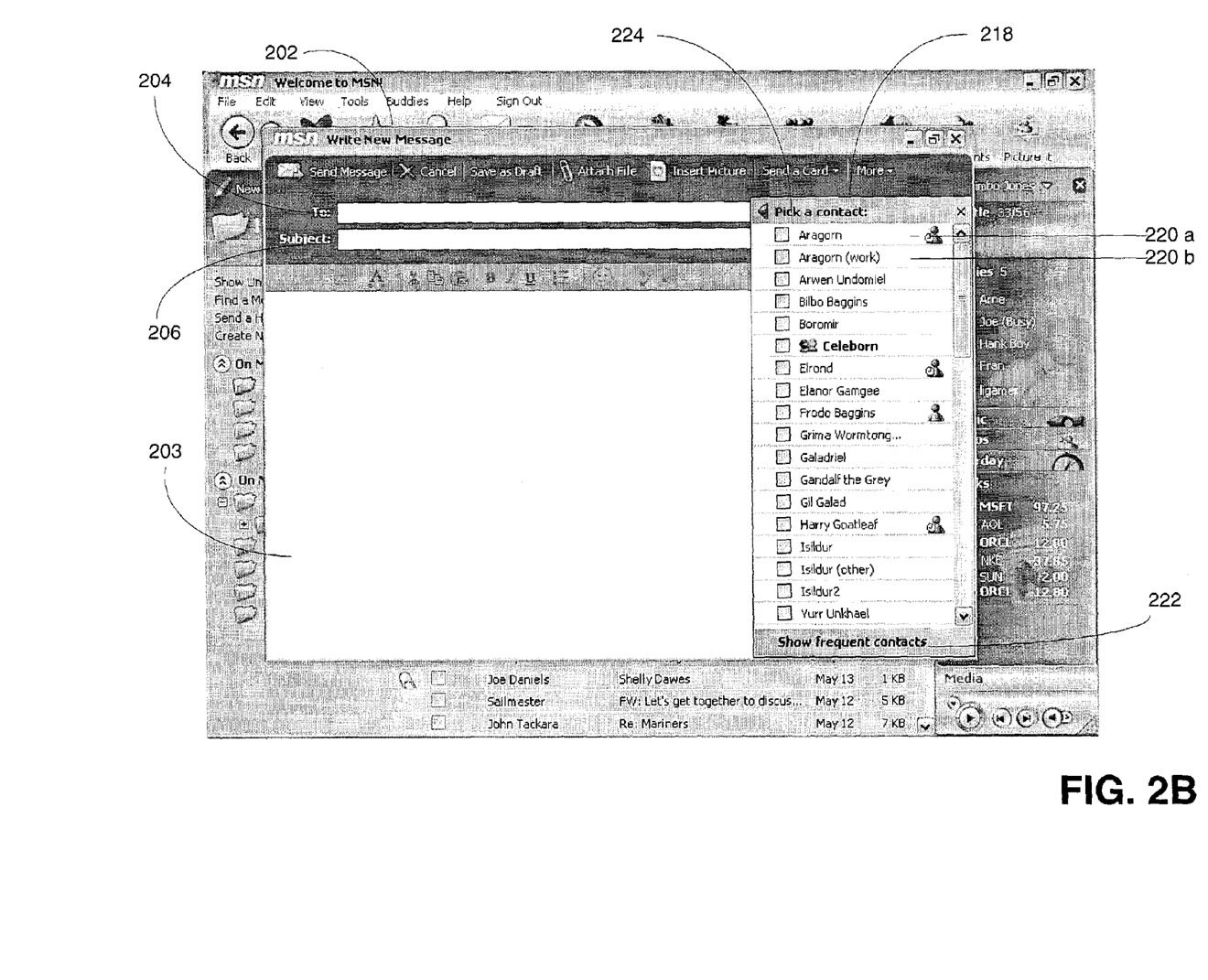
FIG. 2B is an illustrative screen shot of a messaging screen in which the address book pick-list of the present invention is shown in the full listing mode.

As shown in FIG. 2B, a pick-list window 218 displays a 'pick-a-contact' icon 224, an expanded list of recipients 220a, 220b. . . , collectively referenced as 220 and a 'show frequent contacts' icon 222. The behavior of the pick-list window 218 in this instance is identical to pick-list window 208 discussed with reference to FIG. 2A. 'Pick-a-contact' icon 224 provides the same functionality as the 'pick-a-frequent-contact' icon 210. 'Pick-a-Contact' icon 224 places the one or more selected individual recipients or groups of recipients in the 'To-textbox' 204 or other similar recipient designation area of the screen. The expanded recipient list 220 is a list of all contacts that can be found in the address book of the user. Expanded recipient list 220 enables the user to locate and select in much the same way as traditional e-mail systems an intended message recipient.

However, the availability of the 'show frequent contacts' icon 222 enables the user to switch back and forth to the smart MFU list 212, as shown in FIG. 2A.

The switchable modes, MFU mode and Full list mode of the address book picker of the present invention, provide a user with complete and total flexibility in a messaging system. While providing intelligent guidance and anticipation for end user messaging, the present invention also enables the user to operate in a less automated mode as needed. In other words, the user can dictate how much support they desire from the system.

To reiterate, the present invention provides several advantages and features over existing systems. In particular, the present invention provides the automated display of a recipient list at an appropriate juncture in a messaging process. The present invention also provides a listing of most likely recipients for a message. Further, the present invention provides a user with the ability to switch between the list of most likely recipients and a full list of contacts. Even further, the present invention accomplishes all of the foregoing while minimizing resource utilization and ensuring a more pleasurable user experience.

As would be understood by those skilled in the art, the functions discussed herein can be performed on a client side, a server side or any combination of both. These functions could also be performed on any one or more computing devices, in a variety of combinations and configurations, and such variations are contemplated and within the scope of the present invention.

The present invention has been described in relation to particular embodiments which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and within the scope of the claims.

We claim:

1. A method in a computing environment for identifying a likely recipient of electronic mail (e-mail) message comprising:
    maintaining a list of likely recipients based on the frequency the likely recipients have been messaged by a user, wherein:
        (1) the list comprises the number of times each listed likely recipient has been messaged,
        (2) the list contains a maximum number of recipients, and
        (3) new recipients and older recipients are added to and deleted from the list, respectively, on a first in first out (FIBO) basis;
    receiving an indication that a messaging system requires a recipient designation;
    automatically displaying the list of likely recipients for the e-mail message, wherein the likely recipients are included in an address book associated with the messaging system;
    prompting a user to add contact information of a non-address book recipient to the address book when the user previously addresses and sends e-mail messages to the non-address recipient two or more times, wherein the non-address book recipient is a second recipient designation that has not been included in the address book;
    providing the ability to select one or more recipients from said list of likely recipients;
    accepting a selected one or more recipient as targets for the e-mail message
    determining that six or more recipients were targeted for the message; and
    because six or more recipients were targeted for the message, refusing to adjust the indications in the list of frequently messaged recipients.

2. A method as recited in claim 1, wherein said list of likely recipients includes an identified grouping of recipients.

3. A method as recited in claim 1, wherein said list of likely recipients is a list of most frequent contacts.

4. A method as recited in claim 1, wherein said list of likely recipients is a full list of contacts from a messaging system.

5. A method as recited in claim 1, further comprising providing an identifier for the recipient wherein said identifier is a reference to a record within an address book.

6. A method as recited in claim 1, further comprising sending the e-mail message to said selected one or more recipients.

7. One or more computer storage media having computer executable instructions for performing a method for identifying a likely recipient of a message, the method comprising:
    maintaining a list of likely recipients based on the frequency the likely recipients have been messaged by a user, wherein:
        (1) the list comprises the number of times each listed likely recipient has been messaged,
        (2) the list contains a maximum number of recipients, and
        (3) new recipients and older recipients are added to and deleted from the list, respectively, on a first in first out (FIBO) basis;
    receiving an indication that a messaging system requires a recipient designation;
    displaying automatically the list of likely recipients for the message, wherein the likely recipients are included in an address book associated with the messaging system;
    prompting the user to add contact information of a non-address book recipient to the address book when the user addresses and sends an e-mail message to the non-address recipient two or more times, wherein the non-address book recipient is a second recipient designation that has not been included in the address book;
    providing the ability to select one or more recipients from said list of likely recipients; and
    accepting a selected one or more recipient as targets for the message.

8. A method as recited in claim 7, further comprising sending the message to said selected one or more recipients.

9. A computer system having a processor, a memory and an operating environment, the computer system operable to execute a method for identifying a likely recipient of a message, the method comprising:
    maintaining a list of frequently messaged recipients, wherein the list includes indications designating frequencies that the frequently messaged recipients have been messaged;
    when the list includes a threshold number of recipients, adding new recipients to and deleting old recipients from the list on a first in first out (FIBO) basis;
    receiving an indication that a messaging system requires a recipient designation;
    displaying automatically a list of likely recipients for the message, wherein the likely recipients are included in an address book associated with the messaging system;
    providing the ability to select one or more likely recipients from said list of recipients;
    accepting a designation of one or more recipients as targets for the message;
    determining that six or more recipients were targeted for the message; and
    because six or more recipients were targeted for the message, refusing to adjust the indications in the list of frequently messaged recipients.

10. A method as recited in claim 9, further comprising sending the message to said selected one or more recipients.

11. A method as recited in claim 9, wherein said list of likely recipients is ordered according to the most likely intended recipients of the message.

12. A method in a computing environment for providing a list of most likely recipients for a message comprising:
- collecting information regarding a specified message recipient in the computing environment;
- applying a contact frequency algorithm to track said specified message recipient, wherein said specified message recipient is included in an address book associated with a messaging system;
- maintaining a list of likely recipients based on the frequency the likely recipients have been messaged by a user, wherein:
  - (1) the list comprises the number of times each listed likely recipient has been messaged,
  - (2) the list contains a maximum number of recipients, and
  - (3) new recipients and older recipients are added to and deleted from the list, respectively, on a first in first out (FIBO) basis;
- automatically presenting said specified message recipient in an ordered position within the list of most likely recipients upon receiving an indication that a messaging system requires a recipient designation, wherein said ordered position corresponds to the output of said contact frequency algorithm;
- prompting a user to add contact information of a non-address book recipient to the address book when the user addresses an e-mail message to the non-address recipient two or more times, wherein the non-address book recipient is a second recipient designation that has not been included in the address book
- determining that six or more recipients were targeted for the message; and
- because six or more recipients were targeted for the message, refusing to adjust the indications in the list of frequently messaged recipients.

13. A method as recited in claim 12, wherein information regarding said specified message recipient is collected when there is a limited total number of said specified message recipients.

14. A method as recited in claim 12 wherein the list of most likely recipients includes an identified grouping of recipients.

15. A method as recited in claim 12, wherein said specified message recipient is from a list of most frequent contacts.

16. A method as recited in claim 12, wherein said specified message recipient is obtained from a full list of contacts from a messaging system.

17. A method as recited in claim 12, further comprising providing an identifier for said specified message recipient wherein said identifier is a reference to a record within an address book.

18. A method as recited in claim 12, further comprising obtaining a reference to a contact list entry pertaining to said specified message recipient.

19. A method as recited in claim 18, wherein said reference to said contact list is utilized in the presented list of most likely recipients.

20. A method as recited in claim 18 wherein said reference to said contact list remains unchanged with regards to its inclusion or position when there is an edit of said message recipient's contact information such as an e-mail address.

21. One or more computer storage media having computer executable instructions for providing a list of most likely recipients for a message, the method comprising:
- collecting information regarding a specified message recipient in the computing environment;
- applying a contact frequency algorithm to track a specified message recipient, wherein said specified message recipient is included in an address book associated with a messaging system:
- maintaining a list of likely recipients based on the frequency the likely recipients have been messaged by a user, wherein:
  - (1) the list comprises the number of times each listed likely recipient has been messaged,
  - (2) the list contains a maximum number of recipients, and
  - (3) new recipients and older recipients are added to and deleted from the list, respectively, on a first in first out (FIBO) basis;
- obtaining a reference to a contact list entry pertaining to said specified message recipient;
- automatically presenting said specified message recipient in an ordered position within the list of most likely recipients upon receiving an indication that a messaging system requires a recipient designation, wherein said ordered position corresponds to the output of said contact frequency algorithm;
- prompting a user to add contact information of a non-address book recipient to the address book when the user addresses and sends an e-mail message to the non-address recipient two or more times, wherein the non-address book recipient is a recipient designation that has not been included in the address book
- determining that six or more recipients were targeted for the message; and
- because six or more recipients were targeted for the message, refusing to adjust the indications in the list of frequently messaged recipients.

22. A computer system having a processor, a memory and an operating environment, the computer system operable to execute a method for providing a list of most likely recipients for a message, the method comprising:
- collecting information regarding a specified message recipient in the computing environment;
- applying a contact frequency algorithm to track a specified message recipient, wherein said specified message recipient is included in an address book associated with a messaging system;
- maintaining a list of likely recipients based on the frequency the likely recipients have been messaged by a user, wherein:
  - (1) the list comprises the number of times each listed likely recipient has been messaged,
  - (2) the list contains a maximum number of recipients, and
  - (3) new recipients and older recipients are added to and deleted from the list, respectively, on a first in first out (FIBO) basis;
- obtaining a reference to a contact list entry pertaining to said specified message recipient;
- automatically presenting said specified message recipient in an ordered position within the list of most likely recipients upon receiving an indication that a messaging system requires a recipient designation, wherein said ordered position corresponds to the output of said contact frequency algorithm;
- prompting a user to add contact information of a non-address book recipient to the address book when the user addresses an e-mail message to the non-address recipient two or more times, wherein the non-address book recipient is a second recipient designation that has not been included in the address book determining that six or more recipients were targeted for the message; and because six or more recipients were targeted for the message, refusing to adjust the indications in the list of frequently messaged recipients.

23. A computer system having a processor, a memory and an operating environment, for identifying likely message recipients in a messaging computing environment, the computer system comprising:

an automated pick window display component;

a list of selectable likely recipients, wherein each of said selectable likely recipients is included within an address book and is based on the frequency the likely recipients have been messaged by a user, wherein:
  (1) the list comprises the number of times each listed likely recipient has been messaged,
  (2) the list contains a maximum number of recipients, and
  (3) new recipients and older recipients are added to and deleted from the list, respectively, on a first in first out (FIBO) basis; and a recipient identification component;

said recipient identification component utilizing the frequency, context and how recently a contact has received messages, to incorporate a reference to said contact in said list of selectable likely recipients;

said list of selectable likely recipients being incorporated and automatically displayed by said automated pick window display component when a user entry is expected by the messaging computing environment;

said recipient identification component prompting a user to add contact information of a non-address book recipient to the address book when the user addresses an e-mail message to the non-address recipient two or more times, wherein the non-address book recipient is a recipient designation that has not been included in the address book determining that six or more recipients were targeted for the message; and because six or more recipients were targeted for the message, refusing to adjust the indications in the list of frequently messaged recipients.

24. A method in a computing environment for identifying a likely recipient of a message comprising:

maintaining a list of potential recipients based on the frequency the likely recipients have been messaged by a user, wherein:
  (1) the list comprises the number of times each listed likely recipient has been messaged,
  (2) the list contains a maximum number of recipients, and
  (3) new recipients and older recipients are added to and deleted from the list, respectively, on a first in first out (FIBO) basis;

receiving an indication that a messaging system requires a target recipient designation;

displaying automatically the list of likely recipients for the message, wherein the likely recipients are included in an address book associated with the messaging system;

prompting a user to add contact information of a non-address book recipient to the address book when the user addresses an e-mail message to the non-address recipient two or more times, wherein the non-address book recipient is a recipient designation that has not been included in the address book;

providing the ability to toggle between said displayed list of most likely recipients and a full list of contacts;

providing the ability to select one or more target recipients from either said list of most likely recipients or said full list of contacts determining that six or more recipients were targeted for the message; and because six or more recipients were targeted for the message, refusing to adjust the indications in the list of frequently messaged recipients.

25. A method as recited in claim 24, further comprising sending the message to said selected one or more target recipients.

26. A method as recited in claim 24 wherein said list of most likely recipients includes an identified grouping of recipients.

27. A method as recited in claim 24, wherein said list of most likely recipients is a list of most frequent contacts.

28. A method as recited in claim 24, further comprising providing an identifier for each of the selectable one or more target recipients, wherein said identifier is a reference to a record within an address book.

29. A method as recited in claim 1, wherein the list of likely recipients for the message is automatically displayed when a focus is fixated on a To text box within the messenger.

* * * * *